(12) United States Patent
Wu et al.

(10) Patent No.: US 8,603,365 B2
(45) Date of Patent: *Dec. 10, 2013

(54) COATING COMPOSITION AND SURFACE LAYER

(75) Inventors: Jin Wu, Pittsford, NY (US); Lanhui Zhang, Webster, NY (US); Lin Ma, Pittsford, NY (US); Brian P. Gilmartin, Williamsville, NY (US)

(73) Assignee: Xerox Corporation, Norwalk, CT (US)

( * ) Notice: Subject to any disclaimer, the term of this patent is extended or adjusted under 35 U.S.C. 154(b) by 295 days.

This patent is subject to a terminal disclaimer.

(21) Appl. No.: 13/069,530

(22) Filed: Mar. 23, 2011

(65) Prior Publication Data

US 2012/0241687 A1    Sep. 27, 2012

(51) Int. Cl.
*H01B 1/22* (2006.01)
*H01B 1/24* (2006.01)

(52) U.S. Cl.
USPC ........... 252/511; 252/512; 427/99.2; 427/122

(58) Field of Classification Search
USPC ............ 252/511; 427/58, 99.2, 122; 428/421, 428/407
See application file for complete search history.

(56) References Cited

U.S. PATENT DOCUMENTS

| | | | |
|---|---|---|---|
| 4,479,997 A | | 10/1984 | Masterson et al. |
| 5,582,937 A | * | 12/1996 | LaFollette .................... 29/623.1 |
| 5,627,001 A | * | 5/1997 | Vail .......................... 430/111.32 |
| 5,795,500 A | * | 8/1998 | Law et al. ..................... 252/511 |
| 6,061,545 A | | 5/2000 | Cerrah |
| 6,625,416 B1 | | 9/2003 | Badesha |
| 6,830,710 B2 | * | 12/2004 | Bonnet et al. ................. 252/511 |
| 2004/0091715 A1 | | 5/2004 | Pickering et al. |
| 2012/0244339 A1 | * | 9/2012 | Wu et al. ....................... 428/327 |
| 2012/0244464 A1 | * | 9/2012 | Wu et al. ......................... 430/86 |

OTHER PUBLICATIONS

Ahmed: U.S. Appl. No. 13/069,540, Office Action Mar. 25, 2013, 11 pages.
Polymer Plastics Company, Kynar, retrieved Jan. 10, 2013, http://www.polymerplastics.com/insulation_kynar.shtml, p. 1.
English: U.S. Appl. No. 13/069,532, Office Action Jan. 16, 2013, 19pgs.

\* cited by examiner

*Primary Examiner* — Mark Kopec
(74) *Attorney, Agent, or Firm* — Hoffman Warnick LLC

(57) ABSTRACT

The present teachings provide a composition that includes fluoroelastomer particles, core-shell particles wherein the core is a conductive particle and the shell is a fluoroplastic, and a solvent. A surface layer formed from the coating composition is provided.

13 Claims, No Drawings

COATING COMPOSITION AND SURFACE LAYER

CROSS REFERENCE TO RELATED APPLICATIONS

This application relates to commonly assigned copending application Ser. No. 13/069,532 and Ser. No. 13/069,540, filed simultaneously herewith and incorporated by reference in their entirety herein.

BACKGROUND

1. Field of Use

This disclosure is generally directed to a novel surface layer useful in electrophotographic imaging apparatuses, including digital, image on image, and the like.

2. Background

In electrophotographic and ink jet printing certain components require surfaces that are uniform, have a low surface energy and are durable. A surface layer having such properties is useful.

Hydrophobic and olelohobic surface layers are desirable for toner transfer and cleaning efficiency. Fluorinated polymeric layers typically possess the required hydrophobic characteristics; however, the oleophobic characteristics are not suitable for certain electrophotographic and ink jet printing components.

Moreover, surface layers having a low resistivity are useful in certain applications. Surface layers that are hydrophobic, oleophobic and possess a low resistivity are continuously being sought.

SUMMARY

According to an embodiment, there is described a composition comprising a mixture of fluoroelastomers, core-shell particles wherein the core is a conductive particle and the shell is a fluoroplastic, and a solvent.

According to another embodiment, there is described a surface layer comprising a fluoroelastomer matrix having core-shell particles dispersed therein wherein the core is a conductive material and the shell is a fluoroplastic.

According to another embodiment there is provided a method of making a surface layer. The method comprises coating a dispersion of fluoroelastomer particles, core-shell particles wherein the core is conductive material and the shell is a fluoroplastic, and a solvent on a substrate. The coated composition is cured at a temperature and time sufficient to form a surface layer.

DESCRIPTION OF THE EMBODIMENTS

In the following description, reference is made to the chemical formulas that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Furthermore, to the extent that the terms "including", "includes", "having", "has", "with", or variants thereof are used in either the detailed description and the claims, such terms are intended to be inclusive in a manner similar to the term "comprising." The term "at least one of" is used to mean that one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Described herein is a novel hydrophobic coating composition that is useful for forming a surface layer. This conductive hydrophobic and oleophobic coating composition includes fluoroelastomer particles such as VITON having core-shell particles dispersed therein. The core-shell particles are comprised of a conductive core with a fluoroplastic shell.

The coating composition when coated and cured provides a surface coating layer that has a low surface energy. The low surface energy coating exhibits a water contact angle of from about 100° to about 150°, or from about 105° to about 135°, or about 110° to about 130°. The hexadecane contact angle of the surface coating is from about 50° to about 90°, or from about 55° to about 85°, or about 60° to about 80°. As comparison, a fluoroplastic, such as polytetrafluorethylene, or a fluoroelastomer, such as VITON, usually exhibits a water contact angle of about 110° and a hexadecane contact angle of about 45°. In addition, the resistivity of the disclosed coating is from about $10^5$ ohm/square to about $10^{16}$ ohm/square, or from about $10^8$ ohm/square to about $10^{15}$ ohm/square, or from about $10^{12}$ ohm/square to about $10^{14}$ ohm/square, much less resistive than a VITON or PTFE coating, due to the conductive nature of the core shell filler.

The mechanical properties of the disclosed coating are comparable to those of the VITON coating itself including tensile strangle, tensile elongation and Young's modulus.

Fluoroelastomer Matrix

Fluoroelastomers are from the class of 1) copolymers of two of vinylidenefluoride, hexafluoropropylene, and tetrafluoroethylene; such as those known commercially as VITON A® 2) terpolymers of vinylidenefluoride, hexafluoropropylene, and tetrafluoroethylene such as those known commercially as VITON B®; and 3) tetrapolymers of vinylidenefluoride, hexafluoropropylene, tetrafluoroethylene, and a cure site monomer such as those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1, 1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF®, NM® FOR-THF®, FOR-TFS®, TH®, NH®, P757®, TNS®, T439, PL958®, BR9151® and TN505®, available from Ausimont.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

Core-Shell Particles

The core-shell particles comprise a core conductive particle. The core conductive particles are selected from the group consisting of carbon black, carbon nanotube, carbon fiber, graphene, graphite, metal such as copper, aluminum, gold, silver, iron, nickel and bronze, and metal oxide such as tin oxide, zinc oxide and titanium oxide. The core size is from about 10 nanometers to about 1,000 nanometers, or from about 100 nanometers to about 800 nanometers, or from about 200 nanometers to about 600 nanometers.

The shell of the core shell particles comprises a fluoroplastic. Fluoroplastics include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. Fluoroplastic shells provide chemical and thermal stability and have a low surface energy. The fluoroplastic shell is present in an amount of from about 1 weight percent to about 80 weight percent, or from about 5 weight percent to about 60 weight percent, or from about 10 weight percent to about 40 weight percent of the core shell particle.

One commercial example of the bronze PTFE core shell filler is AGLOFLON® 60BZ bronze PTFE core shell filler with a resistivity of $10^7$ ohm*cm; and one commercial example of the carbon PTFE core shell filler is AGLOFLON® 1.2CSC carbon PTFE core shell filler with a resistivity of $10^3$ ohm*cm, both obtained from Ausimont USA.

The coating composition is prepared by dispersing the core-shell particles having the conductive core and the fluoroplastic shell, fluoroelastomers and a solvent. The solvent is selected from the group consisting of tetrahydrofuran, methyl ethyl ketone, methyl isobutyl ketone, N,N'-dimethylformamide, N,N'-dimethylacetamide, N-methylpyrrolidone and methylene chloride. In embodiments, the weight ratio of the fluoroelastomer particles to the core-shell particles in the coating composition is about 99/1 to about 50/50, or from about 95/5 to about 65/35, or from about 90/10 to about 80/20. In embodiments the coating composition comprises a weight percent solids of from about 5 weight percent to about 50 weight percent, or from about 7 weight percent to about 45 weight percent or from about 10 weight percent to about 40 weight percent.

The coating mixture or solution can be coated on a variety of substrates including metals such as stainless steel, copper, nickel, or aluminum, plastics such as polyesters, or polyimides, rubbers such as silicones, or glass.

The coating mixture or solution is coated in any suitable known manner. Typical techniques for coating such materials on the substrate layer include flow coating, liquid spray coating, dip coating, wire wound rod coating, fluidized bed coating, powder coating, electrostatic spraying, sonic spraying, blade coating, molding, laminating, and the like.

After the coating composition is coated, heat is applied to remove the solvent and cure the fluoroelastomers. The temperature for heating for solvent removal and curing is from about 120° C. to about 300° C., or from about 140° C. to about 270° C., or from about 150° C. to about 250° C. The time required for solvent removal varies with the temperature. In embodiments the time is from about 1 hour to about 8 hours, or from about 2 hours to about 7 hours, or from about 3 hours to about 6 hours.

Specific embodiments will now be described in detail. These examples are intended to be illustrative, and not limited to the materials, conditions, or process parameters set forth in these embodiments. All parts are percentages by solid weight unless otherwise indicated.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function.

EXAMPLES

One example of a bronze PTFE core shell filler is AGLOFLON® 60BZ bronze PTFE core shell filler with a resistivity of $10^7$ ohm*cm; and one example of a carbon PTFE core shell filler is AGLOFLON® 1.2CSC carbon PTFE core shell filler with a resistivity of $10^3$ ohm*cm.

Experimentally, the bronze PTFE core shell filler or the carbon PTFE core shell filler was dispersed in a VITON® GF/curative/MIBK solution (about 15 wt % solid) via Attritor milling, respectively. The resulting dispersions (VITON® GF/AGLOFLON® 60BZ=80/20 or VITON® GF/AGLOFLON® 1.2CSC=80/20) were coated respectively on a polyimide substrate via a draw bar coater, and subsequently cured at 75° C. for 20 minutes, 150° C. for 30 minutes and 275° C. for 60 minutes, and a 10 μm thick composite coating was obtained, respectively.

The composite coatings were further tested for contact angles and resistivity, and the results are shown in Table 1, and the data of PTFE or VITON alone are also included for comparison.

TABLE 1

|  | VITON/bronze PTFE core shell filler = 80/20 composite | VITON/carbon PTFE core shell filler = 80/20 composite | PTFE | VITON |
|---|---|---|---|---|
| Water contact angle | 110° | 137° | 110° | 110° |
| Hexadecane contact angle | 60° | 73° | 45° | 45° |

TABLE 1-continued

| | VITON/bronze PTFE core shell filler = 80/20 composite | VITON/carbon PTFE core shell filler = 80/20 composite | PTFE | VITON |
|---|---|---|---|---|
| Resistivity (ohm/square) | $2.3 \times 10^{14}$ | $1.2 \times 10^{12}$ | $1.0 \times 10^{16}$ | $1.0 \times 10^{16}$ |

When compared with PTFE or VITON coatings, the disclosed composite was more oleophopbic (higher hexadecane contact angle), which is critical for toner transfer and cleaning as well as solid ink since they are mostly oil in nature. Furthermore, when compared with the bronze PTFE core shell filler/VITON composite, the carbon PTFE core shell filler/VITON composite is more hydrophobic (higher water contact angle), and more oleophobic (higher hexadecane contact angle). The disclosed composite was also conductive, which was a plus for many Xerox related applications.

The mechanical properties of the disclosed coatings are comparable to those of the VITON coating itself including tensile strength, tensile elongation and Young's modulus.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled the in the art which are also encompassed by the following claims.

What is claimed is:

1. A surface layer comprising a fluoroelastomer matrix having core-shell particles dispersed therein wherein the core is a conductive material having a size of from about 100 nanometers to about 800 nanometers and the shell is a fluoroplastic.

2. The surface layer of claim 1 wherein the conductive material is selected from the group consisting of carbon black, carbon nanotube, carbon fiber, graphene, graphite, metal and metal oxide.

3. The surface layer of claim 1 wherein the fluoroelastomer matrix comprises a material selected from the group consisting of copolymers of two of vinylidenefluoride, hexafluoropropylene, and tetrafluoroethylene; terpolymers of vinylidenefluoride, hexafluoropropylene, and tetrafluoroethylene; and tetrapolymers of vinylidenefluoride, hexafluoropropylene, tetrafluoroethylene, and a cure site monomer.

4. The surface layer of claim 1 wherein the fluoroplastic comprises a material selected from the group consisting of polytetrafluoroethylene; perfluoroalkoxy polymer resin; copolymers of tetrafluoroethylene and hexafluoropropylene; copolymers of hexafluoropropylene and vinylidene fluoride; terpolymers of tetrafluoroethylene, vinylidene fluoride, and hexafluoropropylene; tetrapolymers of tetrafluoroethylene, vinylidene fluoride, and hexafluoropropylene, and mixtures thereof.

5. The surface layer of claim 1 wherein the fluoroelastomer matrix and the core-shell particles are present in a weight ratio of from about 99 to 1 to about 50 to 50.

6. The surface layer of claim 1 comprising a water contact angle of from about 100° to about 150°, and a hexadecane contact angle of from about 50° to about 90°.

7. A method of forming a surface layer comprising;
coating a composition comprising a dispersion of fluoroelastomers, core-shell particles wherein the core is conductive material having a size of from about 100 nanometers to about 800 nanometers and the shell is a fluoroplastic, and a solvent on a substrate; and
curing the composition at a temperature and time sufficient to form a surface layer.

8. The method of claim 7 wherein the conductive material is selected from the group consisting of carbon black, carbon nanotube, carbon fiber, graphene, graphite, metal and metal oxide.

9. The method of claim 7 wherein the solvent is selected from the group consisting of tetrahydrofuran, methyl ethyl ketone, methyl isobutyl ketone, N,N'-dimethylformamide, N,N'-dimethylacetamide, N-methylpyrrolidone and methylene chloride.

10. The method of claim 7 wherein the fluoroelastomes comprise a material selected from the group consisting of copolymers of two of vinylidenefluoride, hexafluoropropylene, and tetrafluoroethylene; terpolymers of vinylidenefluoride, hexafluoropropylene, and tetrafluoroethylene; and tetrapolymers of vinylidenefluoride, hexafluoropropylene, tetrafluoroethylene, and a cure site monomer.

11. The method of claim 7 wherein the fluoroplastic comprises a material selected from the group consisting of polytetrafluoroethylene; perfluoroalkoxy polymer resin; copolymers of tetrafluoroethylene and hexafluoropropylene; copolymers of hexafluoropropylene and vinylidene fluoride; terpolymers of tetrafluoroethylene, vinylidene fluoride, and hexafluoropropylene; tetrapolymers of tetrafluoroethylene, vinylidene fluoride, and hexafluoropropylene, and mixtures thereof.

12. The method of claim 7 wherein the fluoroelastomer particles and the core-shell particles are present in a weight ratio of from about 99 to 1 to about 50 to 50.

13. The method of claim 7 wherein the surface layer comprises a water contact angle of from about 100° to about 150°, and a hexadecane contact angle of from about 50° to about 90°.

* * * * *